UNITED STATES PATENT OFFICE 2,540,218

2-HYDROXY-PYRIDINE-N-OXIDE AND PROCESS FOR PREPARING SAME

Elliott N. Shaw, New York, N. Y., assignor to E. R. Squibb & Sons, New York, N. Y., a corporation of New York No Drawing. Application August 25, 1947, Serial No. 770,545

8 Claims. (Cl. 260—297)

This invention relates to, and has for its object the provision of: [A] N-hydroxy nuclear-keto derivatives of pyridines—especially cyclic-hydroxamic acids of the pyridine series; [B] methods of preparing [A] and related compounds; and [C] intermediates formed in one of the methods [B]. The cyclic-hydroxamic acids of this invention are antibacterial agents, comparing favorably with aspergillic acid in antibacterial properties.

Certain N-hydroxy nuclear-keto derivatives of N-heterocyclic compounds are in tautomeric equilibrium with the corresponding N-oxide nuclear-hydroxy compound; e. g., the cyclic-hydroxamic acid

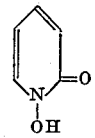

(N-hydroxy-2-pyridone)

is in tautomeric equilibrium with 2-hydroxy-pyridine-N-oxide

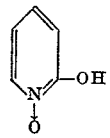

For brevity, this tautomerism will not be alluded to further in the specification following and claims, it being understood that either or both (tautomeric) forms are intended when either is named.

The preferred method of this invention essentially comprises converting an N-heterocyclic compound having an alkoxy (including aralkoxy) group in the heterocyclic nucleus (e. g., 2-benzyloxy-pyridine) into the corresponding N-oxide (e. g., 2-benzyloxy-pyridine-N-oxide), and subjecting the latter to a de-etherification treatment. Alternatively, certain of the N-hydroxy nuclear-keto derivatives of N-heterocyclic compounds (e. g., N-hydroxy-2-quinolone) may be obtained directly by reacting the corresponding nuclear oxy derivative of an N-heterocyclic compound (e. g., carbostyril) with an organic peracid (e. g., perbenzoic acid).

The methods of this invention are especially useful for the preparation of cyclic-hydroxamic acids (the reactant employed having the alkoxy group in the 2-position), especially cyclic-hydroxamic acids of the pyridine series (i. e., wherein the N-heterocyclic nucleus is that of pyridine); various alkoxy groups, such as ethoxy, may be employed, the preferred group being benzyloxy; and various organic peracids, such as peracetic acid, may be employed, the preferred oxidizing agent being perbenzoic acid. The de-etherification may be effected by hydrolysis (especially, with an aqueous mineral acid), or (in the case of benzyloxy compounds) by catalytic hydrogenation.

The novel intermediates formed in the preferred method of this invention are N-oxides of N-heterocyclic compounds having an alkoxy group in the heterocyclic nucleus, especially a benzyloxy group in the 2-position.

The following examples are illustrative of the invention (all melting points recorded being uncorrected; and all solutions or dilutions referred to without identification of the solvent or diluent being solutions in or dilutions with water):

Example 1

(a) 70 g. 2-bromo-pyridine and 60 g. sodium benzylate (a slight excess) are dissolved in 200 ml. benzyl alcohol; the solution is refluxed for two hours; the reaction mixture is poured into water and extracted with ether; and the ether solution is fractionated in vacuo, yielding about 38.5 g. of 2-benzyloxy-pyridine, boiling at about 134–135° C./2 mm.

(b) 37 g. 2-benzyloxy-pyridine is added to a solution of 1.5 equivalents perbenzoic acid (as determined by iodine titration) in about 700 ml. chloroform, and the mixture is left standing at room temperature in a loosely-stoppered flask. After three days, the reaction mixture is washed successively with excess sodium bicarbonate solution and water, dried over anhydrous magnesium sulfate, and concentrated under reduced pressure. The crystalline residue is slurried with a mixture of ethyl acetate and hexane, and recovered by filtration, yielding about 18 g. of 2-benzyloxy-pyridine-N-oxide melting at about 99–102° C. (an about 45% yield). An analytical sample obtained by recrystallization from ethyl acetate and hexane melts at about 102–106° C.; and its C, H, and N content are in good agreement with those calculated for $C_{12}H_{11}O_2N$.

(c) 4.3 g. 2-benzyloxy-pyridine-N-oxide is boiled for 10 minutes with 15 ml. 20% hydrochloric acid under a reflux condenser provided with a take-off to remove benzyl chloride; the turbid solution formed is then evaporated to dryness in vacuo; and the residue is recrystallized from benzene containing a small amount of methanol, yielding about 1.6 g. of N-hydroxy-2-pyridone melting at about 145–147° C. (an about 68% yield). Recrystallization from acetone brings the melting point of the product to about 148–149° C.; and its C, H, and N content are in good agreement with those calculated for $C_5H_5O_2N$.

[Extraction of the mother liquor with ethyl acetate yields a small neutral fraction which melts at about 83–84° C. and whose analysis indicates that it is isomeric with the starting material, 2-benzyloxy-pyridine-N-oxide.]

(c: alternative) 25 g. 2-benzyloxy-pyridine-N-oxide is shaken with hydrogen in 100 ml. ethanol containing 750 mg. palladium catalyst (5% palladium on charcoal), at an initial hydrogen pressure of 50 lbs. After reduction has ceased (about five minutes), the reaction mixture is filtered, and the filtrate concentrated, yielding about 9.5 g. of N-hydroxy-2-pyridone melting at about 150° C. (an about 69% yield).

N-hydroxy-2-pyridone gives a deep red color with an alcoholic solution of ferric chloride, and forms a copper salt of the formula $(C_5H_4O_2N)_2Cu$, melting at about 298° C. with decomposition (after recrystallization from alcohol).

*Example 2*

4.3 g. bromine in 20 ml. glacial acetic acid is added at room temperature to a solution of 3 g. (1 equivalent) N-hydroxy-2-pyridone in 15 ml. glacial acetic acid. After standing two hours at room temperature, the reaction mixture is filtered, and the filtrate is concentrated in vacuo; and the residue (apparently a mixture) is crystallized from ethyl acetate, yielding (as an initial crop of crystals) about 0.65 g. of a bromo-N-hydroxy-2-pyridone melting at about 208–209° C.

*Example 3*

2 ml. concentrated nitric acid is added to a solution of 3.1 g. N-hydroxy-2-pyridone in 15 ml. glacial acetic acid. A nitro-N-hydroxy-2-pyridone is precipitated as light-orange crystals, melting at about 198–199° C., in about 67% yield.

*Example 4*

3-hydroxy-pyridine is added to a chloroform solution of 1.5 equivalents perbenzoic acid; and after standing 12–16 hours, the crystalline product is recovered. The product, 3-hydroxy-pyridine-N-oxide, melting at about 188–190° C., is obtained in about 65% yield; and on recrystallization from methanol, the product melts at about 189–191° C.

*Example 5*

(a) 65 g. 4-pyridyl-pyridinium dichloride is dissolved in 150 ml. hot benzyl alcohol, and the solution is added to a solution of 13 g. sodium in 250 ml. benzyl alcohol. The resultant suspension is refluxed for four hours, and poured into water; the mixture is extracted with ether; the ether extract is dried; and the residue is fractionated, yielding an oil boiling at about 147–160° C. at 4 mm. The product, 4-benzyloxy-pyridine, is redistilled, yielding about 11.5 g. (about 22% yield) boiling at about 155–160° C. at 4 mm., and yielding a picrate melting at 150–151° C. On crystallization from hexane, the free base melts at 55–56° C., and its C, H, and N content are in good agreement with those calculated for $C_{12}H_{11}ON$.

(b) The 4-benzyloxy-pyridine is oxidized with perbenzoic acid as described in section (b) of Example 1, yielding 4-benzyloxy-pyridine-N-oxide, melting at about 178–179° C. Its C, H, and N content are in good agreement with those calculated for $C_{12}H_{11}O_2N$.

(c) The 4-benzyloxy-pyridine-N-oxide is debenzylated by catalytic reduction as described in section (c: alternative) of Example 1. The ethanol filtrate is concentrated and filtered (to remove unreacted starting material crystallizing out); the mother liquor is evaporated to dryness; and the residue is extracted with a small amount of benzene (to remove N-oxide) and recrystallized from a mixture of ethanol and ethyl acetate. The product, N-hydroxy-4-pyridone, melts at about 238–240° C.

*Example 6*

7 g. carbostyril is added to a solution of perbenzoic acid (50% excess) in 150 ml. chloroform, and the reaction mixture is allowed to stand at room temperature for about 7 days, and then evaporated to dryness and desiccated to a dry powder. The residue is triturated with ether, and filtered several times to remove benzoic acid; and the ether-insoluble material is extracted with sodium carbonate solution. The aqueous solution obtained is acidified with 10% hydrochloric acid, and the precipitate formed is recovered and crystallized from benzene. The product, N-hydroxy-2-quinolone, melts at about 190–192° C.; and its C, H, and N content are in good agreement with those calculated for $C_9H_7O_2N$.

Among the other compounds obtainable by the hereinbefore-described methods of this invention are:

7. N-hydroxy-4-methyl-2-pyridone, melting at about 129–130° C.; obtainable, in about 75% yield as described in section (c) of Example 1, from 2-benzyloxy-4-methyl-pyridine - N - oxide (melting at about 81–82° C., obtainable in about 53% yield as described in section (b) of Example 1, from 2-benzyloxy-4-methyl-pyridine).

8. N-hydroxy-5-bromo-2-pyridone, melting at about 137–139° C.; obtainable in about 13% yield as described in Example 6 from 2-hydroxy-5-bromo-pyridine.

9. N-hydroxy-6-bromo-2-pyridone, melting at about 155–157° C.; obtainable in about 19% yield as described in Example 6 from 2-hydroxy-6-bromo-pyridine.

10. 2 - benzyloxy - 5 - bromo - pyridine N - oxide, melting at 127–128° C.; obtainable as described in section (b) of Example 1 from 2-benzyloxy-5-bromo-pyridine (melting at about 56–58° C., obtainable, as described in section (a) of Example 1, from 2,5-dibromo-pyridine).

11. N-hydroxy-7-chloro-4-quinolone, melting at about 262° C.; obtainable in about 73% yield, as described in section (c: alternative) of Example 1, from 4-benzyloxy-7-chloro-quinoline-N-oxide [melting at about 163° C.; obtainable in about 65% yield as described in section (b) of Example 1, from 4-benzyloxy-7-chloro-quinoline (melting at about 100–101° C., obtainable in about 57% yield, as described in section (a) of Example 1, from 4,7-dichloro-quinoline)].

12. 1 - hydroxy - 3,6 - di - (sec. butyl) - 2 - pyrazinone, obtainable as described in Example 1 from 2-chloro-3,6-di-(sec. butyl) - pyrazine.

The invention may be variously otherwise embodied within the scope of the appended claims.

I claim:

1. The method of preparing an N-hydroxy-2-pyridone, which comprises converting a pyridine having an alkoxy group in the 2-position into the corresponding N-oxide, subjecting the latter to a de-etherification treatment, and recovering the resulting N-hydroxy-2-pyridone.

2. The method of preparing N-hydroxy-2-pyridone, which comprises converting 2-benzyloxypyridine into the corresponding N-oxide, subjecting the latter to a de-etherification treatment, and recovering the resulting N-hydroxy-2-pyridone.

3. The method which comprises reacting a pyridine having an alkoxy group in the 2-position with an organic peracid, subjecting the resulting N-oxide to a de-etherification treatment, and recovering the resulting N-hydroxy-2-pyridone.

4. The method which comprises converting a pyridine having a benzyloxy group in the 2-position into the corresponding N-oxide, catalytically-hydrogenating the latter, and recovering the resulting N-hydroxy-2-pyridone.

5. N-hydroxy-2-pyridone.

6. An N-oxide of a pyridine having an alkoxy group in the 2-position.

7. An N-oxide of a pyridine having a benzyloxy group in the 2-position.

8. An N-oxide of a pyridine having in the 2-position a member of the class consisting of hydroxy and alkoxy groups.

ELLIOTT N. SHAW.

REFERENCES CITED

The following references are of record in the file of this patent:

Beilstein: Vierte Auflage, vol. 21, pp. 270 and 306.

Maier-Bode et al.: Das Pyridin, pp. 6 and 142 (1934).